(12) United States Patent
Redford

(10) Patent No.: US 9,176,312 B2
(45) Date of Patent: Nov. 3, 2015

(54) FAST, MODULAR PORT SWITCHER FOR AN OPTICAL MICROSCOPE USING A GALVANOMETER

(71) Applicant: INTELLIGENT IMAGING INNOVATIONS, INC., Denver, CO (US)

(72) Inventor: Glen Ivan Redford, Arvada, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 340 days.

(21) Appl. No.: 13/648,340

(22) Filed: Oct. 10, 2012

(65) Prior Publication Data

US 2013/0094071 A1   Apr. 18, 2013

Related U.S. Application Data

(60) Provisional application No. 61/547,459, filed on Oct. 14, 2011.

(51) Int. Cl.
*G02B 26/08* (2006.01)
*G02B 21/18* (2006.01)
*G02B 26/00* (2006.01)

(52) U.S. Cl.
CPC .............. *G02B 21/18* (2013.01); *G02B 26/007* (2013.01); *G02B 26/0816* (2013.01)

(58) Field of Classification Search
CPC .. G02B 21/00; G02B 21/002; G02B 21/0052; G02B 21/18; G02B 26/0916
USPC ........... 359/221.2, 199.1, 198.1, 212.1, 213.1
See application file for complete search history.

(56) References Cited

U.S. PATENT DOCUMENTS

| | | | |
|---|---|---|---|
| 4,567,478 A | 1/1986 | Schwab | |
| 4,801,197 A | 1/1989 | Minami | |
| 5,579,156 A | 11/1996 | Faltermeier et al. | |
| 5,687,262 A | 11/1997 | Buchin | |
| 5,748,812 A * | 5/1998 | Buchin | 385/18 |
| 2005/0046933 A1 | 3/2005 | Luecke et al. | |
| 2005/0088731 A1 | 4/2005 | Shinada | |

(Continued)

FOREIGN PATENT DOCUMENTS

| | | |
|---|---|---|
| DE | 103 36 475 | 3/2005 |
| EP | 1970744 | 9/2008 |
| WO | WO 01/37012 | 5/2001 |

OTHER PUBLICATIONS

International Search Report for International (PCT) Application No. PCT/US10/54960, mailed Dec. 29, 2010.

(Continued)

*Primary Examiner* — Euncha Cherry
(74) *Attorney, Agent, or Firm* — Jason H. Vick; Sheridan Ross, PC

(57) ABSTRACT

A fast modular port switching device is described. The device can be used with an optical microscope to facilitate using multiple devices with the microscope. The port switching is done with a galvanometer for switching very fast. The device is modular so it can be combined with any number of similar devices for building a complex, multi-modal imaging system. Also described is the combination of a port switcher with automated spherical aberration correction. Even further described is a similar device where the outputs are recombined, thus making the device a fast filter switcher.

47 Claims, 8 Drawing Sheets

(56) References Cited

U.S. PATENT DOCUMENTS

| | | |
|---|---|---|
| 2007/0035821 A1 | 2/2007 | Hecker |
| 2008/0204865 A1 | 8/2008 | Yoneyama et al. |
| 2008/0316561 A1 | 12/2008 | Okugawa |
| 2011/0102887 A1 | 5/2011 | Redford |

OTHER PUBLICATIONS

Written Opinion for International (PCT) Application No. PCT/US10/54960, mailed Dec. 29, 2010.

International Preliminary Report on Patentability for International (PCT) Application No. PCT/US10/54960, mailed May 18, 2012.

Official Action for European Patent Application No. 12007078.4, mailed Jan. 31, 2013.

Official Action (Restriction Requirement) for U.S. Appl. No. 12/917,102, mailed Feb. 1, 2013.

Official Action for U.S. Appl. No. 12/917,102, mailed Mar. 20, 2013.

Supplementary European Search Report for European Application No. 10828951.3, mailed Apr. 22, 2013.

European Search Report for European Patent Application No. 12007078.4, mailed May 15, 2013.

Official Action for European Patent Application No. 12007078.4, mailed Jul. 3, 2015.

\* cited by examiner

FAST, MODULAR PORT SWITCHER FOR AN OPTICAL MICROSCOPE USING A GALVANOMETER

RELATED APPLICATION DATA

This application claims the benefit of and priority under 35 U.S.C. §119(e) to U.S. Patent Application No. 61/547,459, filed 14 Oct. 2011, entitled "Fast, Modular Port Switcher for an Optical Microscope using a Galvanometer," which is incorporated herein by reference in its entirety.

BACKGROUND OF THE INVENTION

Modern digital microscopy is more and more multi-modal. More frequently there are found multiple imaging devices and specialized illumination devices. For example, it is not uncommon for a light microscope to be capable of wide-field imaging as well as optical sectioning. Lasers, detectors, scanners, and other devices are now added in ever increasing numbers to a single system. The benefit is that a single specimen can be analyzed in many different ways to increase the amount of information collected. Modern motorized microscopes often are equipped with multiple documentation ports to accommodate multiple devices. These documentation ports are automated and can be switched between with the controlling computer. Currently these devices take several seconds to perform a switch. In many cases this is too slow to see transitory signals. Switching times becomes important for multi-modal systems.

Modern microscopy also takes advantage of high NA (Numerical Aperture) objectives and high resolution imaging. Spherical aberration limits the use of such objectives to only ideal imaging situations. A separate patent application, "Spherical Aberration Correction for an Optical Microscope using a Moving Infinity-Conjugate Relay," U.S. patent application Ser. No. 12/887,869, filed 22 Sep. 2010, which is incorporated herein by reference in its entirety, describes means for correcting spherical aberration.

In fluorescence microscopes, it is also more common to perform multi-channel imaging, meaning that fluorophores of different colors are sequentially imaged. In multi-channel imaging, a common method of separating the colors is to move different color filters into the optical pathway. During rapid acquisition, the time for the filter to change is often the rate limiting step.

SUMMARY

An exemplary aspect generally relates to optical path switching in optical microscopes. More specifically, an exemplary embodiment relates to a modular port switcher device. Even more specifically, an exemplary embodiment of the invention relates to a modular port switcher device which is external to the main microscope. Even more specifically, an exemplary embodiment of the invention relates to a galvanometer-based port switcher device.

Even more specifically, an exemplary embodiment of the invention relates to a combination of a port switcher device and a spherical aberration correction device. Additionally, an exemplary embodiment of this invention relates to a modular filter switcher device. Even more specifically, and exemplary embodiment of this invention relates to a galvanometer-based filter switcher device.

Outside of the main body of the microscope there is a location in the optical train called the image plane. This is the location where the specimen of interest may be imaged with an optical device such as a camera. Should one wish to send the image to more than one optical device, one could insert a mirror before the image plane and send the light to the second device. This does not allow much room for multiple devices as the image plane is generally near the body of the microscope. This also has the disadvantage that the mirror is in a converging beam space and so any imperfections on the mirror will appear in the image.

A better idea is to relay the image to a point further from the microscope and then to redirect the image to the different device(s). This can be done optically in many ways, but one way to do this is to use an infinity-conjugate relay. This has a benefit of an infinity space within the relay which is an ideal space for a mirror. In an infinity space, imperfections in the mirror have a much lesser effect on the image. An infinity space is also the ideal location to place an optical filter. Furthermore, an infinity-conjugate relay is easy to make free of image distortions. Ideally, the infinity conjugate relay is made in such a way that the conjugate space is also relayed (for bidirectional use with scanners for example).

A galvanometer can be used to create a very fast turning mirror. This is inserted into the infinity space of the relay, which creates a number of optical paths. The image is then directed to a number of different devices.

Accordingly, one exemplary embodiment of the invention is directed toward a galvanometer based port switcher. The galvanometer is used to redirect the image to a number of different optical paths. This galvanometer will typically be controlled by an electronic system such as a computer. The electronic control will allow the galvanometer to by synchronized to one or more other devices.

One exemplary relay system involves three positive lenses. The first lens is placed the distance of its focal length from the image plane. The galvanometer is placed between the lenses, creating a path from the first lens to the second or from the first to the third lens. Ideally the distance between the two lenses is equal to the sum of their focal lengths. If positioned correctly, and if the two lenses are equal, a "zero" point can be established where the original focal plane is imaged with no additional magnification or distortion. This condition can be met for both optical paths.

The exemplary apparatus can comprise an optical relay with at least two optical paths, which are selected by means of a reflecting device such as a mirror and a means for moving the mirror, such as a motor, a computer-controlled motor, or the like.

This apparatus would provide means for selecting between two (or more) devices which are optically coupled to the microscope.

If the device is made modular, meaning that it is mechanically and optically a separate unit couplable to one or more other devices, it can be combined with other such devices for more complicated multi-modal operation. Ideally, although not required, each input/output port is optically identical. To do this, a mechanical and optical standard is adhered to for each port. An exemplary embodiment of such a standard is one where the image plane and the acceptance angle are fixed relative to the mechanical coupling of a port. Ideally, this standard is symmetric, so a given port can act as an input or output.

Because an infinity conjugate relay is the primary part of one method of correcting for spherical aberration in microscopy, one can take advantage of the relay present in the port switching device to additionally correct for spherical aberration. All that would be additionally required would be means for moving the input lens along the optical axis. This would allow finding and relaying the desired aberration-free image from the focal volume.

An additional exemplary relay system includes two positive lenses which create an infinity space between them. In this space, a galvanometer can be used to direct the light through one of several optical filters. The light paths are then recombined using mirrors or polychromatic mirrors and sent out of the relay. Such a device would include a fast filter switcher—using a galvanometer (with switch speeds of ~1 ms) would make the device an order of magnitude faster than currently available filter wheels. This would give one benefit of being able to switch in the transfer time of a CCD (Charge Coupled Device), thus allowing continuous multichannel imaging without pausing the camera.

There are several techniques one could use to recombine the paths created by the galvonometer. One design would use dichroic beamsplitters to recombine the beams. This has the advantage of only needing one galvanometer, but has the disadvantage that there could not be any unfiltered path and the dichroics would have to be specifically chosen and placed in order to allow for multiple paths. This would also reduce the efficiency of the system as each dichroic would introduce losses and some of the paths would have to transverse several dichroics.

Another design would be to use mirrors to redirect the light to a second galvanometer which would be used to recombine the beams. This has the advantage of allowing free filter choice including a no-filter option. The disadvantage is the added cost of a second galvonometer with its electronics.

One exemplary design for the filter switcher device would involve redirecting the different paths back to the galvanometer that created the different paths. The paths would then be descanned and redirected back along the input optical path. If an angle is introduced by the mirrors that are reflecting the paths back to the galvanometer such that the paths are redirected to a point along the axis of the galvanometer, then the exit path is separated from the input paths. This has the advantage of only needing one galvanometer. To keep the size of the device compact, one could place the filters directly in front of the mirrors. This means that the light would transverse the filter twice (double filtering). The small angle in the paths would only shift slightly the cutoff wavelengths of the filter. Modern filters have <3% loss, so double filtering would have little loss.

Aspects of the exemplary device can comprise:
an optical relay with at least two paths which are selected by means of a reflecting device such as a mirror;
means for moving the mirror; and
appropriate optics for recombining the optical paths into a single output.

This apparatus would provide means for selecting one of several optical filters placed in the several optical paths.

Aspects of the invention are also directed toward port switching in optical microscopes.

Still further aspects of the invention are directed toward a modular port switcher device.

Even further aspects of the invention are directed toward a modular port switcher device which is external to the main microscope.

Still further aspects of the invention are directed toward galvanometer-based port switcher device.

Even further aspects of the invention are directed toward a fast modular port switcher that can be combined with other such devices to build a complicated multi-modal device.

Even further aspects of the invention are directed towards a combination port switching device and spherical aberration correction device.

Even further aspects of the invention are directed to a filter switching device.

Still further aspects of the invention are directed to a galvanometer based filter switching device.

Even further aspects of the invention are directed toward automated control and software for the device.

Still further aspects of the invention relate to an apparatus for port switching including:
a relay system with at least two optical paths selected by a reflective device;
means for moving the reflective device; and
means for controlling the motion of the reflective device to select the desired optical path.

The aspect above, where the reflective device is motorized.
The aspect above, where the reflective device is motorized by using a galvanometer.
The aspect above, where the motorization control device is synchronized with the detector.
The aspect above, where the means for moving the reflective device can do so in under the transfer time of the imaging camera.
The aspect above, where the input lens of the relay can be moved along the optical axis.
The aspect above, where the optical paths are then recombined to a single output.
The aspect above, where optical filters are placed in the several paths.
The aspect above, where the apparatus is combined with an optical microscope.
The aspect above, where the apparatus is combined with an electronic imaging device such as a camera.
The aspect above, where the apparatus is combined with a scanning microscope.
The aspect above, where the scanning microscope is a confocal microscope.
The aspect above, where the scanning microscope is a two-photon microscope.
The aspect above, where the apparatus has a "zero" mode where the effective images are unaltered from the image were the apparatus not present.
The aspect above, where the apparatus is automated and controlled with a computer program.

These and other features and advantages of this invention are described and, or are apparent from, the following detailed description of the exemplary embodiment.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to microscopes, imaging systems, and associated components. However, it should be appreciated that, in general, known components will not be described in detail. For purposes of explanation, numerous details are set forth in order to provide a thorough understanding of the present invention. It should be appreciated however that the present invention may be practiced in a variety of ways beyond the specific details set forth herein.

Figure 1:
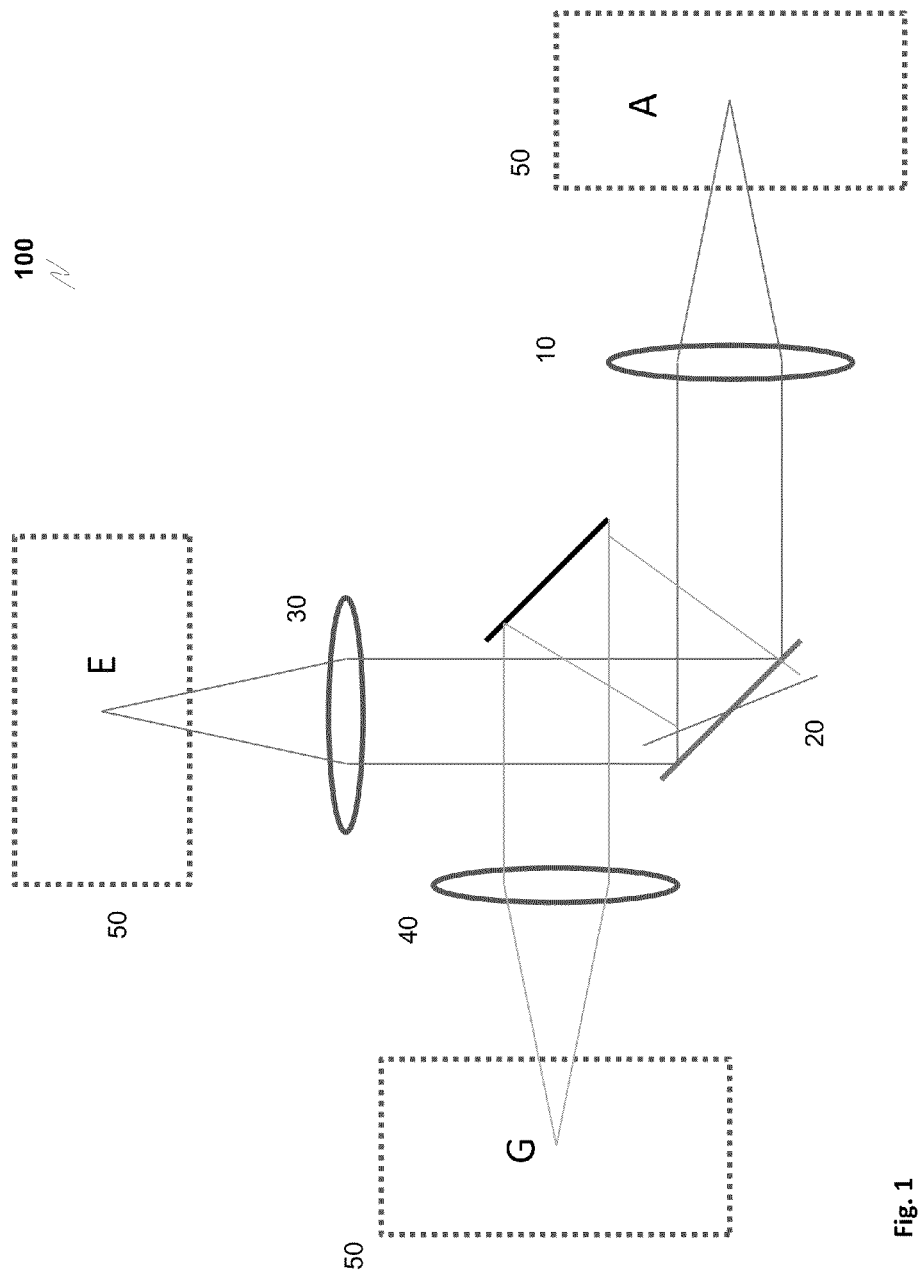
FIG. 1 illustrates an exemplary optical diagram of a port switcher.

FIG. 1 illustrates an exemplary optical diagram of a port switcher 100. The input image A is imaged with lens 10 which forms an infinity space between the lenses. The light path hits a moving mirror 20. The light is directed to lens 30 which recreates the image at E. Alternatively, the mirror redirects the light to lens 40 which recreates the image at G. At all of the image planes, a modular mounting standard 50 creates a port.

Figure 2:
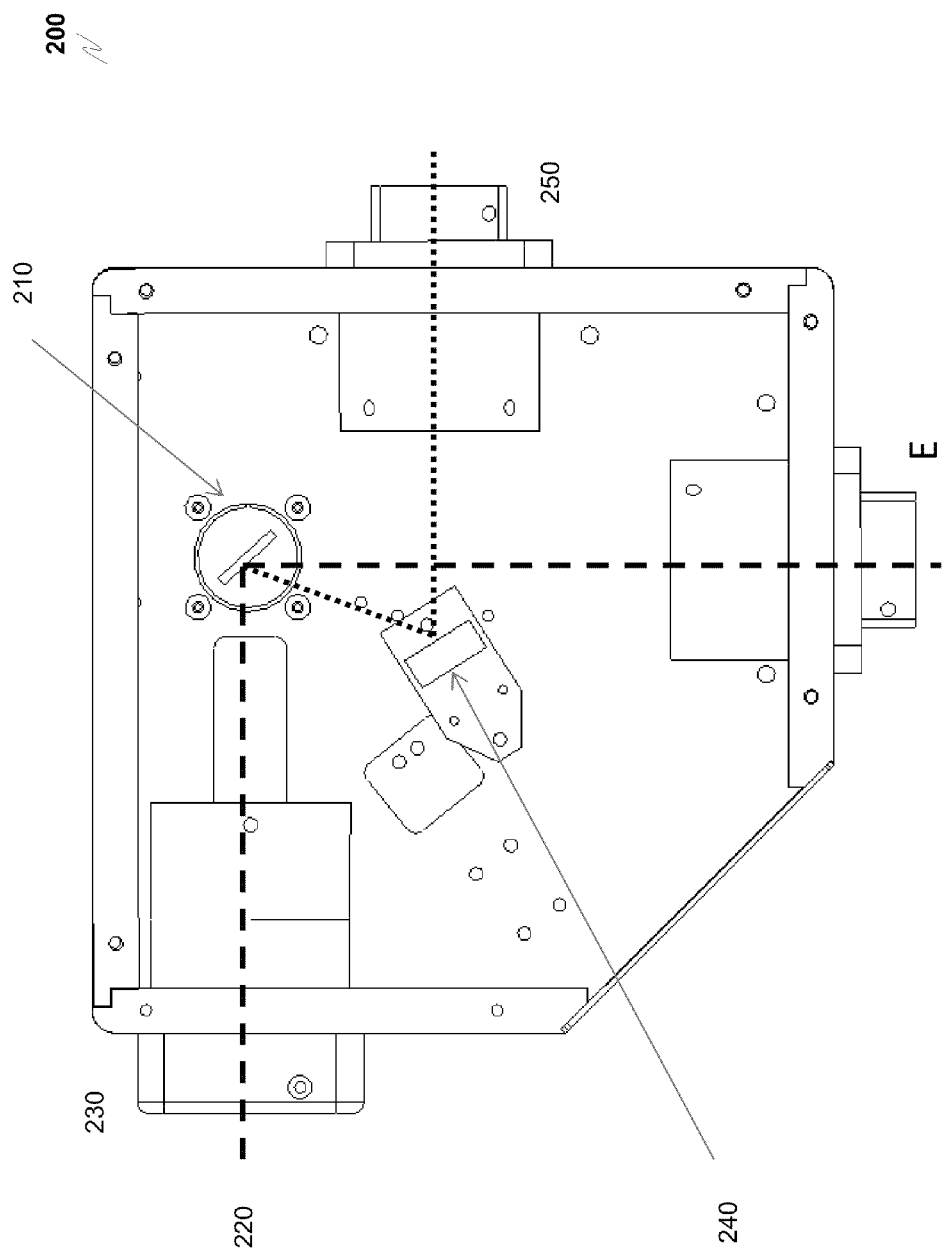
FIG. 2 illustrates an exemplary port switcher device.

FIG. 2 illustrates an exemplary port switching device 200. The galvanometer is held with the hardware 210 to be within the optical pathway. The image enters the input port 220 using the standard mounting hardware 230. Lenses create two optical paths from the galvanometer; one path includes a fixed mirror 240 for convenience. The image then exits at the standard mounting ports 250.

Figure 3:
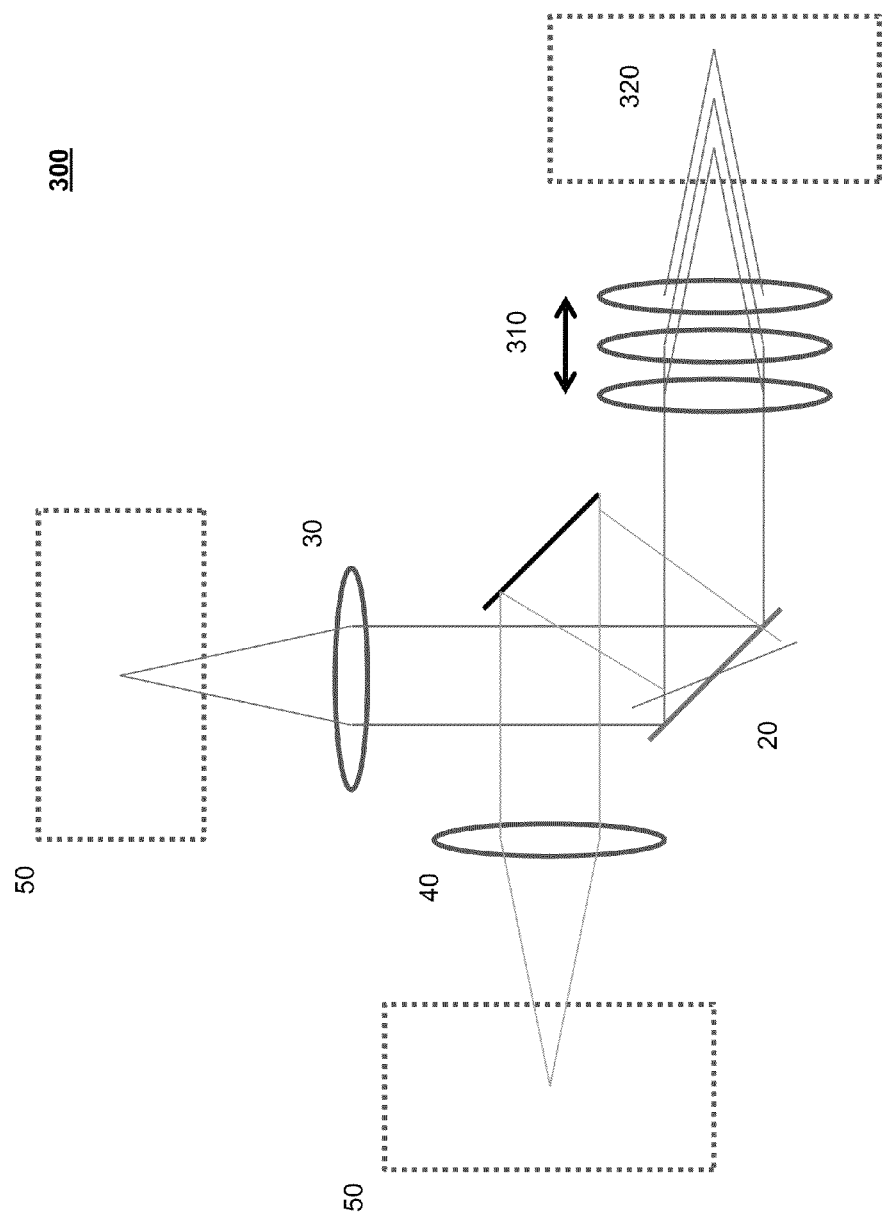
FIG. 3 illustrates an exemplary optical diagram of a port switcher including spherical aberration correction.

FIG. 3 illustrates an exemplary optical diagram of a port switcher including spherical aberration correction 300. This diagram is the same as in FIG. 1, but here, the input imaging lens 310 can be moved, via one or more controllers and/or motors, along the optical axis as shown by the arrow. This allows selection of the desired plane from the focal volume 320.

Figure 4:
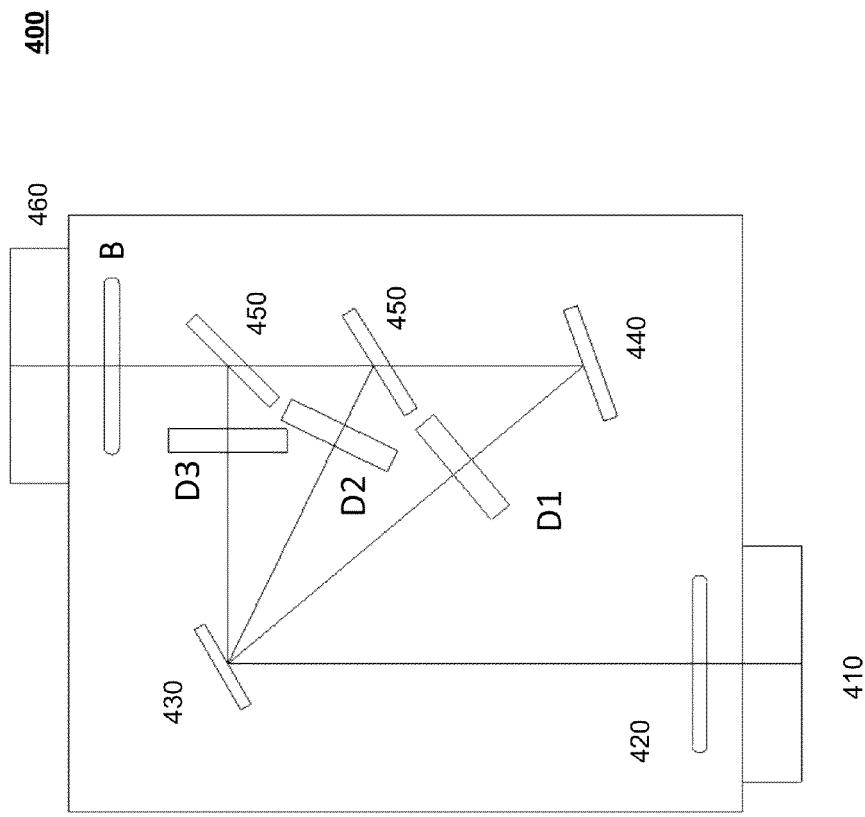
FIG. 4 illustrates an exemplary optical diagram of a filter switcher.

FIG. 4 illustrates an exemplary optical diagram of a filter switching device 400. The image enters the input port 410 and is cast to infinity by lenses 420. The galvanometer 430 sends the image through one of the filters D1, D2, or D3. A mirror 440 and polychromatic mirrors 450, recombine the optical paths and the image exits at 460.

Figure 5:
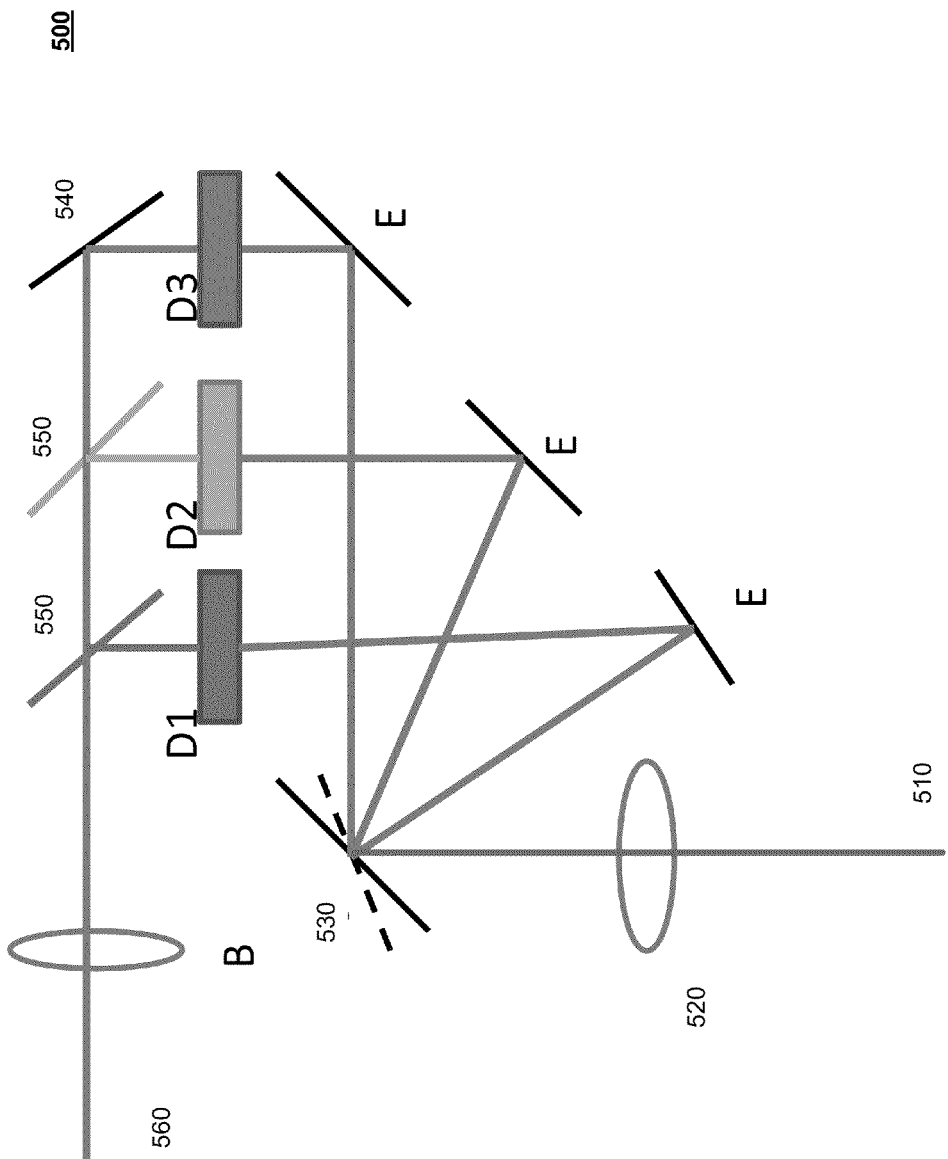
FIG. 5 illustrates an exemplary optical diagram of a filter switcher.

FIG. 5 illustrates an exemplary optical diagram of a filter switching device 500. The image enters the input port 510 and is cast to infinity by lenses 520. The galvanometer 530 sends the image through one of the filters D1, D2, or D3. Mirrors 540 and polychromatic mirrors 550, recombine the optical paths and the image exits at 560.

Figure 6:
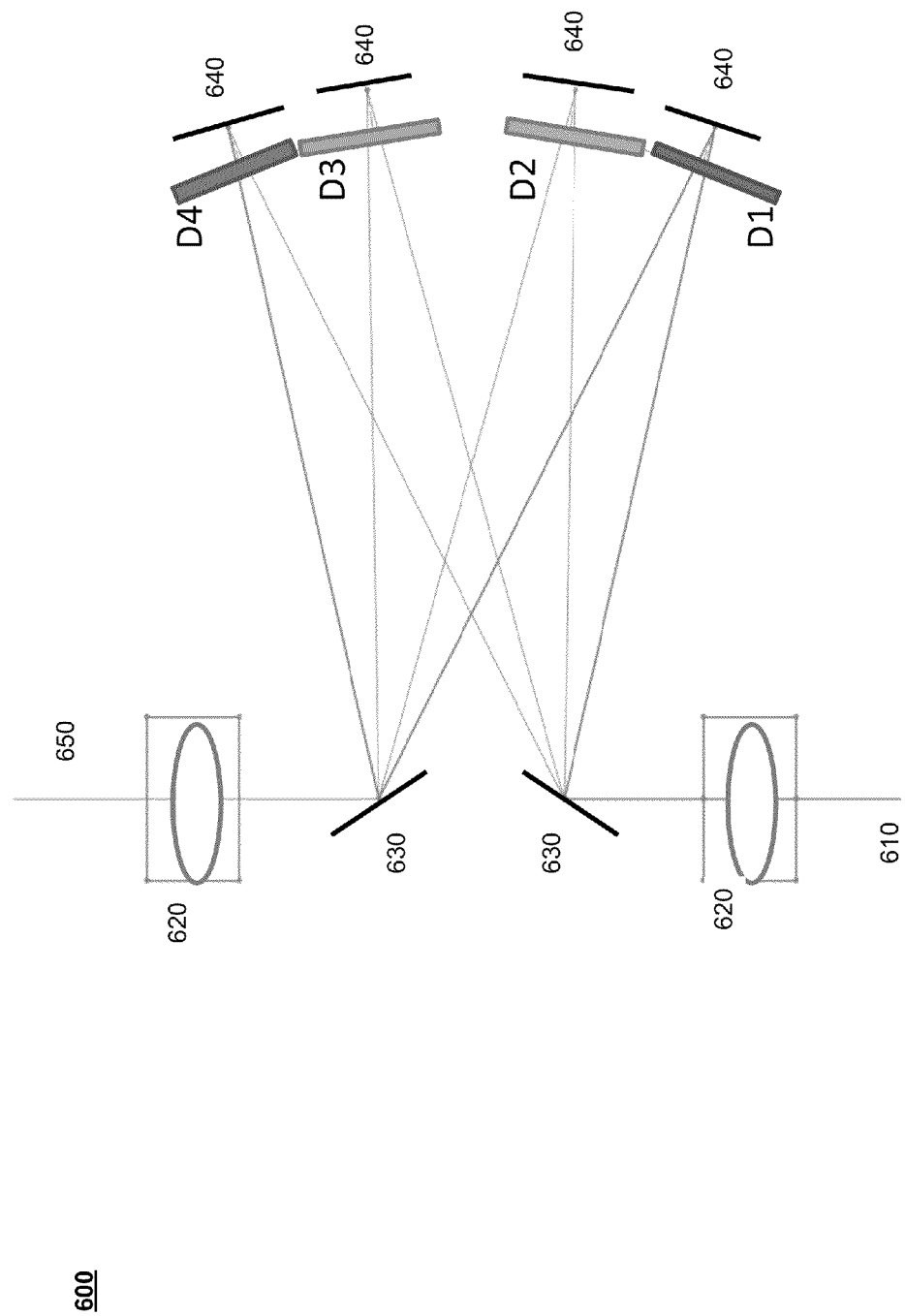
FIG. 6 illustrates an exemplary optical diagram of a filter switcher.

FIG. 6 illustrates and exemplary optical diagram of a filter switching device 600. The image enters the input port 610 and is cast to infinity by lenses 620. The galvanometers 630 both separate and recombine the beams after they have passed through one of the filters D1, D2, D3, or D4. The mirrors 640 are used to direct the various paths and the image is output at 650.

Figure 7:
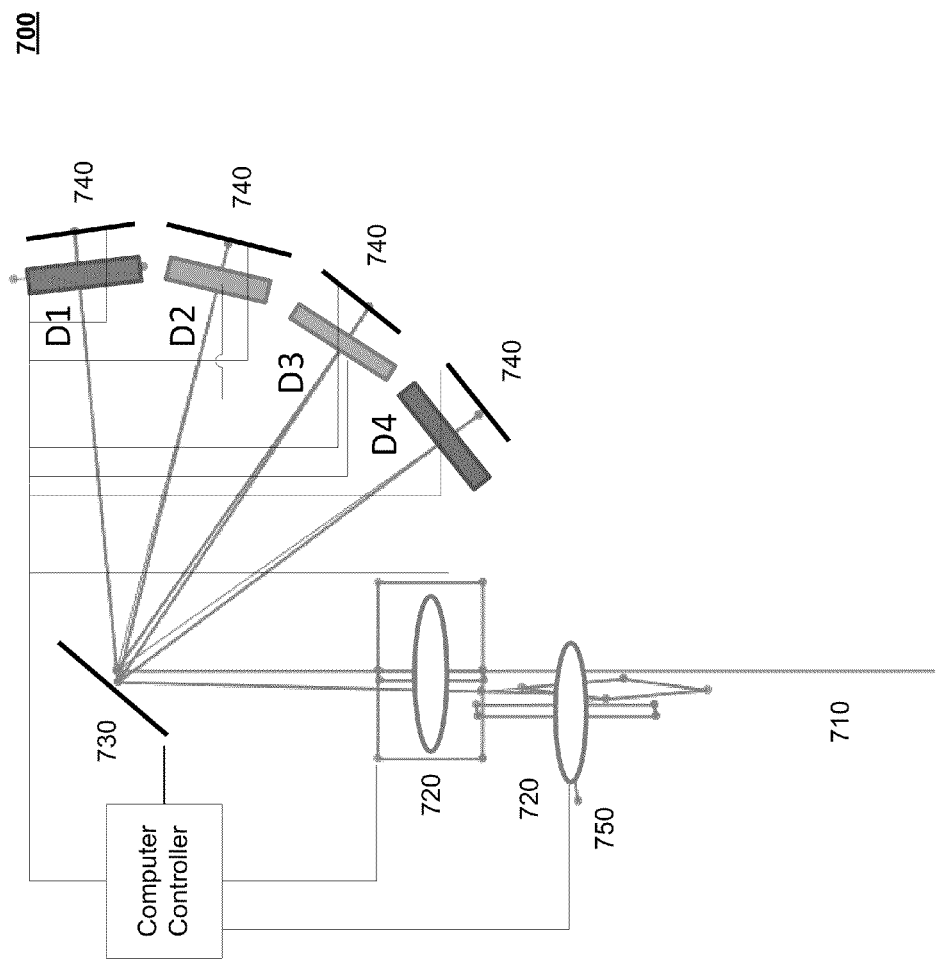
FIG. 7 illustrates an exemplary optical diagram of a filter switcher.

FIG. 7 illustrates and exemplary optical diagram of a filter switching device 700. The image enters the input port 710 and is cast to infinity by lenses 720. The galvanometer 730 both separates and recombines the beams after they have passed through one of the filters D1, D2, D3, or D4. There is an angle introduced by the mirrors 740 which direct the various paths back to the galvanometer 730. The image is output at 750.

Figure 8:
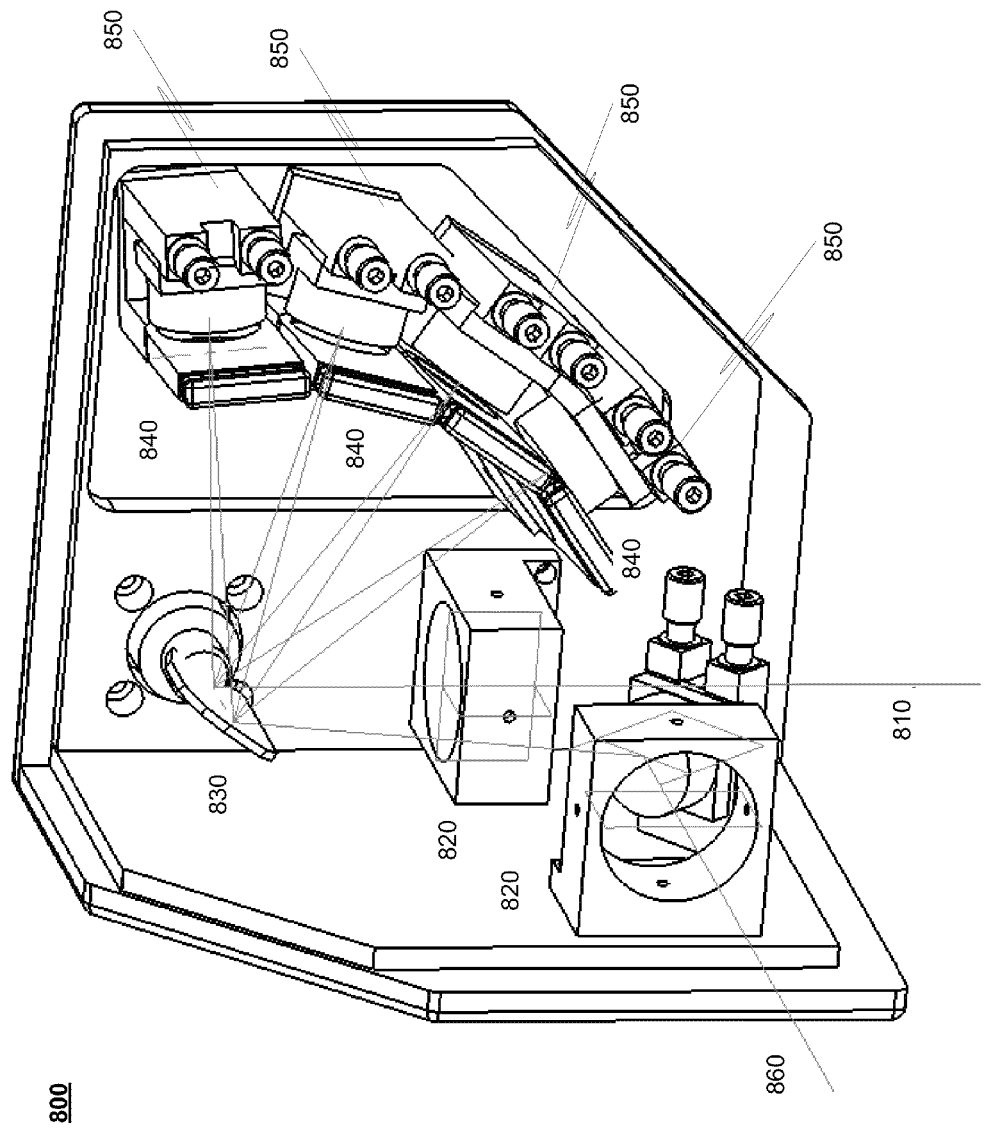
FIG. 8 illustrates an exemplary filter switcher device.

FIG. 8 illustrates an exemplary fiber switching device 800. This is an exemplary embodiment of the optical diagram of FIG. 7. Shown are the input 810, the lenses at 820, the galvanometer 830, the filters 840, the mirrors 850, and the output at 860. This exemplary embodiment illustrates a compact commercial device that would attach to a microscope between the microscope and, for example, a camera(s).

The exemplary techniques illustrated herein are not limited to the specifically illustrated embodiments but can also be utilized with the other exemplary embodiments and each described feature is individually and separately claimable, or claimable in combination with any one or more of the other features described herein.

The systems of this invention can cooperate and interface with a special purpose computer and/or controller and/or motor controller, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like.

Furthermore, the disclosed control methods and optional controller graphical user interfaces may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or micro-computer systems being utilized.

It is therefore apparent that there has been provided, in accordance with the present invention, a port switcher device. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A switching system for a microscope comprising:
    a relay system adapted to redirect an image of a specimen of interest along more than one optical path;
    a reflecting device adapted to redirect the image; and
    a controller adapted to control motion or movement of the reflecting device.

2. The system of claim 1, wherein the switching device is external to the microscope.

3. The system of claim 1, wherein the reflecting device is a mirror.

4. The system of claim 3, wherein the mirror is turned with a galvanometer.

5. The system of claim 1, wherein a second controller controls synchronization between one or more imaging devices and the motion controller.

6. The system of claim 1, further comprising a computer adapted to control the motion or movement.

7. The system of claim 3, further comprising a modular device.

8. The system of claim 7, wherein ports of the modular device adhere to an optical and mechanical standard to facilitate combination with one or more other devices.

9. The system of claim 5, wherein the motion can occur during a transfer time of an imaging device.

10. The system of claim 1, further comprising a means to move an input lens along an optical axis.

11. The system of claim 10, wherein the input lens is used to select a desired image plane from a focal volume.

12. The system of claim 11, wherein the motion of the lens is automated.

13. The system of claim 12, wherein the motion of the lens and the reflecting device are synchronized.

14. The system of claim 1, further comprising optical means to recombine the more than one path.

15. The system of claim 14, where the relay system contains a galvanometer.

16. The system of claim 14, where optical elements are placed in the optical paths such that the device can select from the several optical elements.

17. The system of claim 16, where the optical elements are polychromatic filters or colored glass.

18. The system of claim 16, where the optical elements are birefringent or are polarizers.

19. The system of claim 14, where the means for recombining the optical paths includes one or more of mirrors and polychromatic mirrors.

20. The system of claim 14, further comprising means for integrating spherical aberration correction with the device.

21. The system of claim 14, further comprising means for splitting the combined optical output into one of several optical paths.

22. The system of claim 14, wherein a motion of a galvanometer is synchronized using a computer with one or more of hardware and a camera.

23. An optical microscope system comprising:
   a self contained optical image relay with more than one optical path that relays an image of a specimen of interest to one of several outputs; and
   means for selecting the optical path.

24. The system of claim 23, where the optical image relay is an infinity-conjugate relay.

25. The system of claim 23, where the infinity-conjugate relay also relays a conjugate image.

26. The system of claim 23, where the means for selecting the optical path is a moving mirror.

27. The system of claim 25, where the moving mirror is moved using a galvanometer.

28. The system of claim 23, where the means for selecting the optical path is an acousto-optical device.

29. The system of claim 25, where the motion of the mirror is synchronized to one or more of an external device and a camera.

30. The system of claim 23, further comprising one or more lenses that can be moved to correct spherical aberration.

31. The system of claim 30, where the motion of the lens can be synchronized to one or more of an external device and a camera.

32. A microscope fast filter-switcher system adapted to be associated with an optical microscope comprising:
   a self contained optical image relay with more than one optical path;
   means for selecting the optical path; and
   means for recombining the optical path such that an image of a specimen of interest is relayed to one output, the image having traversed one of the more than one optical paths.

33. The system of claim 32, where the optical relay is an infinity-conjugate relay.

34. The system of claim 33, where the infinity-conjugate relay also relays a conjugate image.

35. The system of claim 32, where the means for selecting the optical path is a moving mirror.

36. The system of claim 35, where the moving mirror is moved using a galvanometer.

37. The system of claim 32, where the means for selecting the optical path is an acousto-optical device.

38. The system of claim 35, where the motion of the mirror is synchronized to one or more of an external device and a camera.

39. The system of claim 32, where the means for recombining the optical paths includes fixed mirrors and dichroics.

40. The system of claim 32, where the means for recombining the optical paths includes at least a second moving mirror.

41. The system of claim 40, where the second mirror is moved using a galvanometer.

42. The system of claim 34, where the means for recombining the optical paths uses the same moving mirror that was used to redirect the paths.

43. The system of claim 41, where a slight angle is introduced as the optical paths are redirected to the moving mirror such that the output beam has a different angle than the input beam.

44. The system of claim 41, where the moving mirror is moved using at least one galvanometer.

45. The system of claim 32, where different optical filters are placed in the different optical paths such that the device can select between the optical filters.

46. The system of claim 44, where the optical filters are placed such that the path transverses the filter twice.

47. The system of claim 41, where the motion of the mirror is synchronized to one or more of an external device and a camera.

* * * * *